E. REYNOLDS.
REVERSIBLE TEMPLE MEMBER FOR SPECTACLES.
APPLICATION FILED JUNE 4, 1921.

1,394,863.

Patented Oct. 25, 1921.

Inventor:
Edwin Reynolds,

UNITED STATES PATENT OFFICE.

EDWIN REYNOLDS, OF VINELAND, NEW JERSEY.

REVERSIBLE TEMPLE MEMBER FOR SPECTACLES.

1,394,863.   Specification of Letters Patent.   Patented Oct. 25, 1921.

Application filed June 4, 1921. Serial No. 475,125.

*To all whom it may concern:*

Be it known that I, EDWIN REYNOLDS, a citizen of the United States, residing at Vineland, in the county of Cumberland and State of New Jersey, have invented certain new and useful Improvements in a Reversible Temple Member for Spectacles; and I do hereby declare the following to be a full, clear, and exact description of the invention, such as will enable others skilled in the art to which its appertains to make and use the same, reference being had to the accompanying drawings, and to the figures and letters of reference marked thereon, which form a part of this specification.

The present invention has reference to certain new and useful improvements in spectacle and the like frames and relates more particularly to a novel construction of temple joint, that is the hinge connection between the lens frame proper and the temple member, and the object of my invention is the provision of a reversible and wear-proof temple that can selectively be used as right or left member in connection with the conventional type of frame, which includes an angularly directed stop ledge for the temple, without calling for any alteration whatever either in the frame or the temple member, and which is not liable to be thrown out of function by a portion thereof wearing unduly away in use.

Figure 1:
Figure 2:
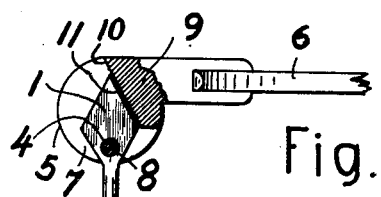
Figure 3:
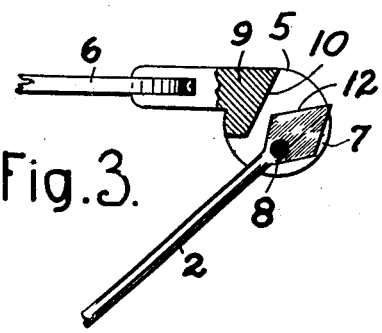
Figure 4:
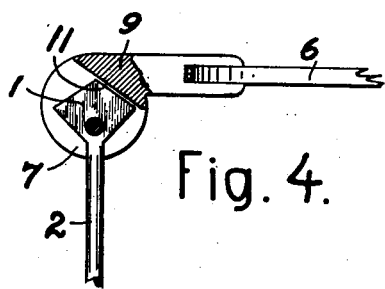

With these objects in view my invention consists in the construction, arrangement and coöperation of parts as will now be described in detail in connection with the accompanying drawing, in which Figure 1 is a plan view of the new temple member, with the middle portion broken out; Fig. 2 shows a left-hand joint or hinge, with the top cheek of the lens clamp or end piece broken away to expose the underlying parts and the temple in operative position, that is to say rectangularly directed relative to the lens frame; Fig. 3 is a plan view of a right-hand joint, partly in section, with the temple partly folded back, and Fig. 4 shows a slightly modified construction of parts.

The preferred form of temple member shown in Figs. 1, 2 and 3 comprises the end hinge plate 1, the shaft 2, and the ear loop 3. The end plate 1 is substantially of lozenge shape with the more or less acute apex *a* lying in the axis of the shaft, and the bore 4 for receiving the pivot pin or hinge pintle somewhat back of a line connecting the two obtuse angle points *b*. The hinge member 5, which clasps the lens 6 in any well known manner, presents conventionally the two spacedly superimposed cheeks, of which only the lower one 7 is shown here, between which the temple plate 1 is hingedly secured by the pivot pin 8, these cheeks extending from the solid portion 9 of the clamp member 5, whereby between the cheeks a stop face or ledge 10 is presented of such relative angular direction that it will flatly contact with the respective inner lozenge face 11 in Fig. 2 (or 12 in Fig. 3) when the temple bar assumes its operative position rectangularly of the lens frame, as clearly shown in Fig. 2. The location of the pivot pin 8 as fulcrum for the temple is such that the parts coöperate eccentrically in such manner that the temple is stopped in its operative position but can readily be folded back upon the lens frame as shown in Fig. 3.

It is readily seen that such a temple can be fitted to right or left hand frame end pieces, as requirements may call for, so that the optometrist need carry in stock only half the number of temples he is now required to stock up with; and the contacting surfaces 11 and 12 being relatively long a wearing-away to an extent where their stopping object would be defeated need not be feared.

Although I have shown in Figs. 1, 2, and 3, only the preferred form of temple by way of example, I want it to be particularly understood that I do not limit myself to this particular lozenge shape of hinge plate, but reserve myself the right to vary the shape within certain limits according to the contour and angular direction of the coacting stop ledge 10, as long as the hinge plate is relatively eccentrically fulcrumed and contacts substantially all down its operative face with the opposed stop ledge. Thus, for instance, the apex angle at *a* may be less acute and the obtuse angles at *b* less obtuse, as shown in Fig. 4, if the extent and the relative angular direction of the stop ledge requires it.

What I claim is:—

1. In combination with a spectacle frame including an angularly directed stop ledge, a reversible temple eccentrically fulcrumed on said frame.

2. In combination with a spectacle frame including an angularly directed stop ledge, a reversible temple presenting right and left operative faces respectively substantially identical in extent and direction with the coöperating stop ledge.

3. In a spectacle temple a hinge plate of substantially lozenge shape.

4. A spectacle temple presenting at its one extremity a substantially lozenge-shaped perforated hinge plate.

5. A spectacle temple, comprising the shaft and a substantially lozenge-shaped hinge plate having a perforation positioned back of the line connecting the two obtuse angles and the acute lozenge apex lying in the shaft axis.

6. In combination with the spectacle frame end piece including a stop means, a temple presenting a hinge plate of substantially lozenge shape adapted to hingedly eccentrically coöperate with said stop means.

7. In combination with a spectacle frame including two spaced-apart cheeks and an angularly directed stop ledge therebetween, a temple presenting at the one extremity a substantially lozenge-shaped perforated hinge plate adapted for eccentric coöperation with said stop ledge, the relative angular direction of said stop ledge coinciding with that of the respective coöperating lozenge face in the operative position of the parts.

EDWIN REYNOLDS.